United States Patent [19]

Snashall et al.

[11] Patent Number: 5,043,800

[45] Date of Patent: Aug. 27, 1991

[54] METHOD AND APPARATUS FOR KEYING A DIGITAL VIDEO SIGNAL

[75] Inventors: Martin G. Snashall, Reading; Mark R. Andrews, Northampton; David F. Levy, Andover, all of United Kingdom

[73] Assignee: Abekas Video Systems Limited, United Kingdom

[21] Appl. No.: 407,270

[22] Filed: Sep. 14, 1989

[30] Foreign Application Priority Data

Sep. 21, 1988 [GB] United Kingdom ............... 8822161

[51] Int. Cl.⁵ ............... H04N 9/74; H04N 5/262; H04N 5/272
[52] U.S. Cl. ............................. 358/22; 358/183
[58] Field of Search .................... 358/22, 183

[56] References Cited

U.S. PATENT DOCUMENTS 4,356,512 10/1982 Robers .............................. 358/22
4,951,145 8/1990 Snashall et al. ..................... 358/22

Primary Examiner—James J. Groody
Assistant Examiner—Wendy R. Greening
Attorney, Agent, or Firm—Silverman, Cass & Singer, Ltd.

[57] ABSTRACT

A method and apparatus for keying digital color TV signals to avoid "stairstepping" of pixels at the edges of the key while retaining a hard switch between the keyed scenes. This is achieved by comparing successive digital keying signals with a desired digital clip level. In the event that the clip level occurs between two successive digital signals an interpolation of the clip level between these is created fractionally. A digital representation of this fraction is then included in the keying signal so that keying is accomplished on a sub-pixel basis without acutally increasing the frequency of sampling.

16 Claims, 2 Drawing Sheets

METHOD AND APPARATUS FOR KEYING A DIGITAL VIDEO SIGNAL

BACKGROUND OF THE INVENTION

1. Field of the Invention

This invention relates to a method and apparatus for processing digital video signals, e.g. digital colour TV signals, and in particular to keying of such signals.

2. Description of the Related Art

A particular problem with keying techniques (the overlaying of different scenes) in digital video signals is the observed "stairstepping" of pixels at the edges of the key—for example at the edges between two displayed scenes on a single TV screen or at the edges of graphics as displayed on a computer monitor. This stairstepping is particularly apparent in colour video, where there is intended to be an abrupt change of colour at the edges of the key.

This problem is less acute with analog video signals, as the key signal is a smooth waveform transition across the key edge. It is possible to clip or limit the signal at any point over this transition so as to get a sharp edge to the keyed pictures. With digital key signals this is not possible. The frequency of digitally sampling the key is not fast enough to provide an accurate representation of the transition waveform, with the result that the transition at the edge between two scenes is made on a pixel-to-pixel basis whereas a more accurate key would require faster sampling (i.e. smaller pixels)—which is currently not possible. This key switching on a pixel-by-pixel basis causes the "stairstepping" phenomenon described above.

SUMMARY OF THE INVENTION

The present invention reduces such stairstepping whilst retaining a hard switch between keyed scenes. It does this without requiring a faster digital sampling of the TV signal.

According to the invention there is provided an apparatus for keying a digital video signal, which comprises means for receiving a digital keying signal stream, each signal in the stream representing information relating to an adjacent pixel to be displayed, means for comparing successive digital signals in said stream with a desired digital clip level and, in the event that said clip level occurs between two successive digital signals, for interpolating the position of the clip level between said successive signals fractionally on a sub-pixel basis, and means for transmitting said fractional level digitally in an output keying signal.

According to the invention there is also provided a method of keying a digital video signal, which comprises receiving a digital keying signal stream, wherein each signal in the stream represents information relating to an adjacent pixel to be displayed, comparing successive digital signals in said stream with a desired clip level, and, in the event that said clip level occurs between two successive digital signals, interpolating the position of the clip level between said successive signals fractionally on a sub-pixel basis, and transmitting said fractional level digitally in an output keying signal.

BRIEF DESCRIPTION OF THE DRAWINGS

A preferred embodiment of the invention will now be described, by way of example, with reference to the accompanying drawings, wherein.

DESCRIPTION OF THE PREFERRED EMBODIMENTS

Referring to FIGS. 1a–1e assume that a keying signal goes from 0% to 100% across the edge of the key, and that it is desired to key (clip) at the 30% level in time. Assume also that it is desired that the keying signal should be exactly half (50%) at the selected clip level.

Figure 1A:
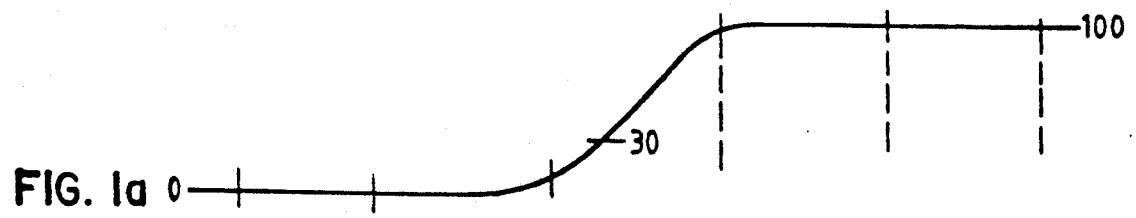
FIGS. 1a–1e depict various waveforms for understanding of the invention.
Figure 1B:
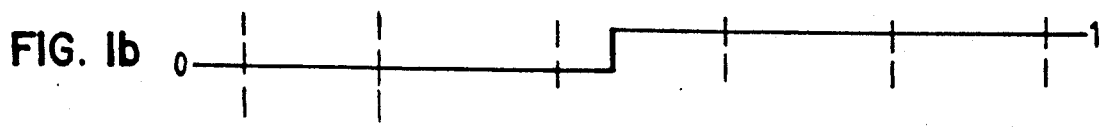
Figure 1C:
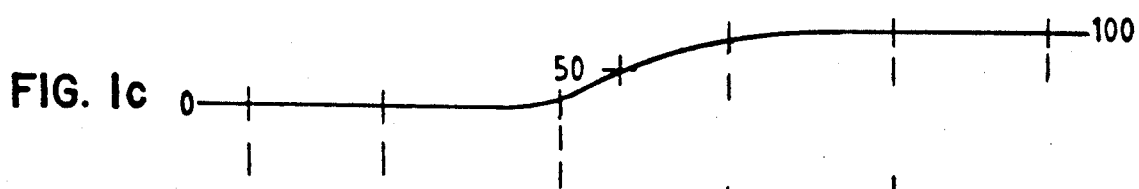

With an analog keying signal, this situation is depicted in FIG. 1(a). A level sensor is set to trigger at 30% and the result (from "0" to "1") is shown in FIG. 1(b). The FIG. 1(b) waveform may be transmitted through a low pass filter to soften the signal. The result is FIG. 1(c): the key signal goes from 0% to 100% with the 50% crossing point occurring at the 30% level in time of the original key.

Figure 1D:
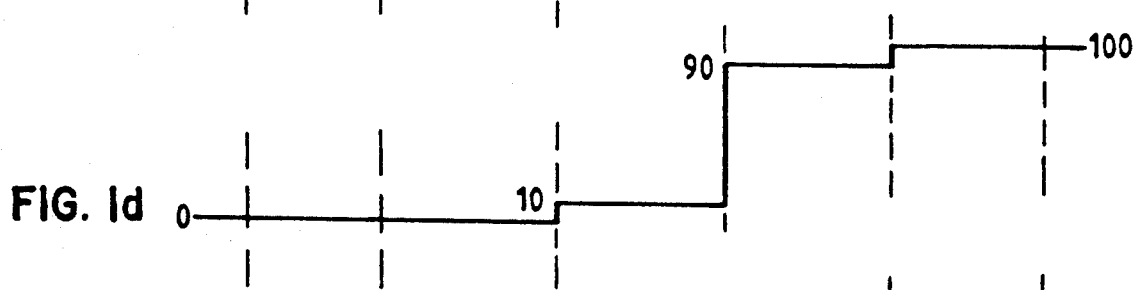

A corresponding digital keying signal is shown in FIG. 1(d). The sampling times for the signal are shown by the dotted vertical lines, so as to give successive digital key signals of 0,0,10,90,100,100. The desired 30% clip level has been lost. If these signals were employed with a level detector (or comparator) for keying, the 90% level would be selected. This would result in keying at the edge of the pixel commencing at the 90% level—some distance away from desired position. This keying, at the edge of complete pixels, leads to the stairstepping phenomenon mentioned above.

Figure 1E:
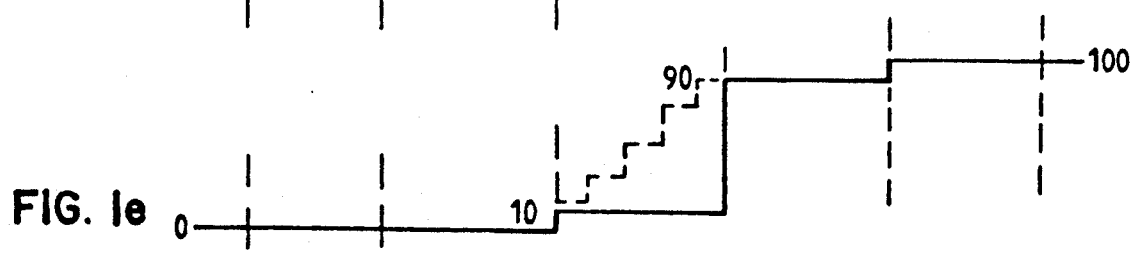

Although it would be possible to reduce this problem by sampling the TV signal at a faster rate—thus using much smaller pixels—this is not possible within the limits of the frequency restraints on current colour TV signals. A faster sampling of the keying signal is shown in FIG. 1(e). The present invention, without actually sampling at such a faster rate, simulates this by interpolating the clip position from the values of at least one of the digital signals on each side of the desired key.

The simplest interpolation is a linear interpolation between two digital keying values. For the example shown in FIG. 1(d), the digital key values are 0,0,10,90,100,100 whereas it is desired to clip or key at 30. The invention interpolates as follows. Assume that the keying signal is a series of 8-bit digital words (i.e. 0,0,10,90,100,100 as six successive 8-bit words). The invention considers the values of each two successive words thus:

(a) if two successive words are below the clip level (30), in this case for the words 0,0,10, then output an 8-bit "0" as the keying signal;

(b) if two successive words are above the clip level (30), in this case for the words 90,100,100, then output an 8-bit "1" as the keying signal;

(c) if the clip level (30) is exceeded between two successive words, in this case 10,90, then:

(i) the two successive words are subtracted, $90 - 10 = 80$, (ii) the clip level (30) is subtracted from the second of the two words (90), $90 - 30 = 60$, (iii) the result of (ii) is divided by the result of (i), $60 \div 80 = \frac{3}{4}$, and this is subtracted from "1" = $\frac{1}{4}$.

(iv) the result of (iii) is transmitted as an 8-bit word. (As the latter has 256 permutations, and 00000000 = "0" and 11111111 = "1", $\frac{1}{4}$ is transmitted as binary 64 viz. 00100000).

The result of the above interpolation is to reconstitute the keying signal as 0,0,1/4,1,1 in 8-bit digital format—which provides a more accurate representation with reference to the clip level.

This reconstituted keying signal is then filtered through a digital low pass filter so as to introduce a degree of softness into the keying transition. Such filtering techniques are known per se. If it is desired that there should be a 50% transition in the keying signal at the period in time equivalent to a clip level of 30, then the above digital technique will thus achieve this (essentially on a subpixel basis). In the absence of this interpolation, digital filtering would have created the 50% transition at the pixel-edge level (90).

The above explanation has been given with reference to a positive-going signal exceeding a clip level. It will be appreciated that the invention applies equally to negative-going signals descending past a clip level.

Figure 2:
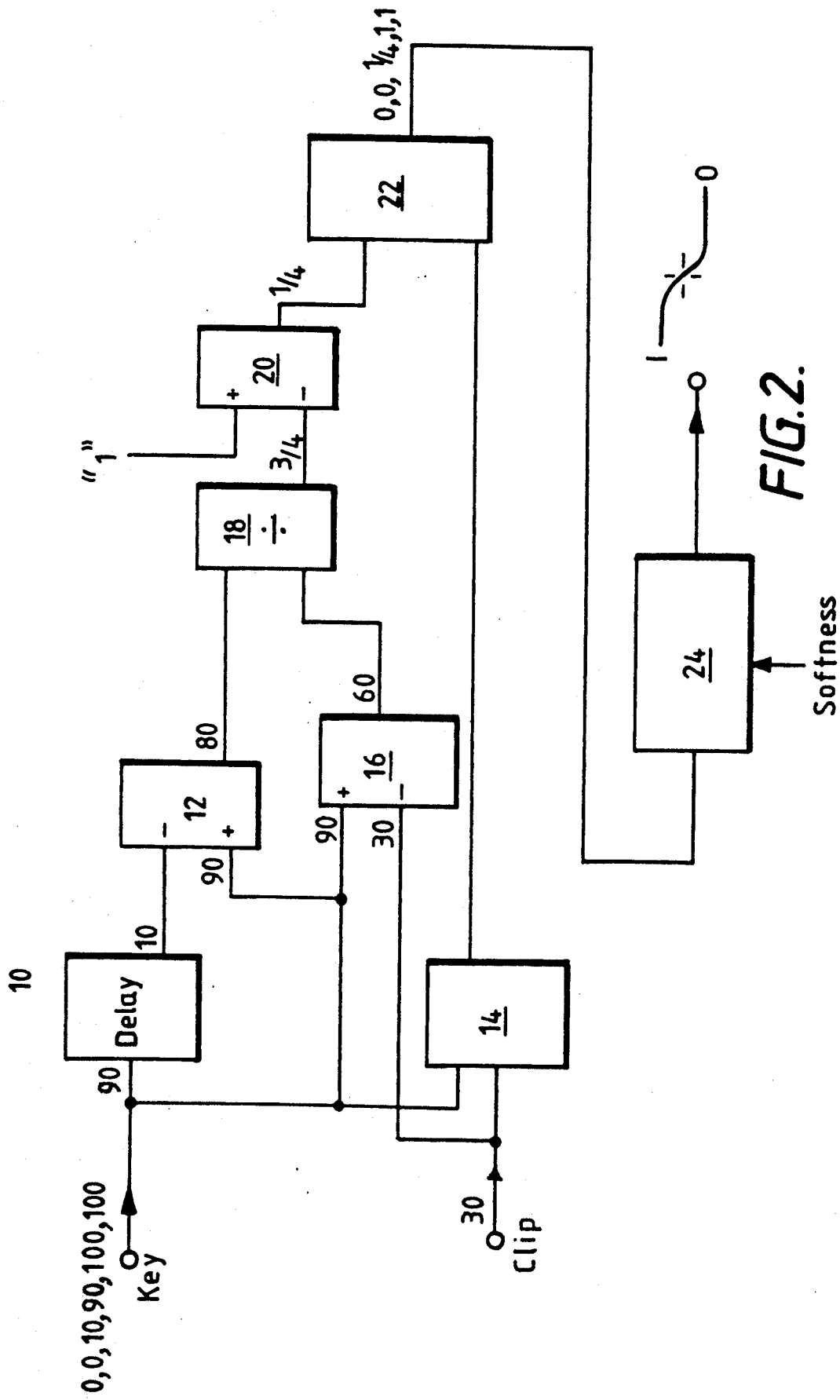
FIG. 2 is a schematic circuit diagram of a preferred apparatus of the invention.

Referring to FIG. 2, the preferred apparatus receives the keying signal and the desired clip level in 8-bit digital format. The keying signal is passed through a one-pixel delay circuit 10 and then to a difference circuit 12 which also receives the non-delayed keying signal. The clip level signal and the keying signal are supplied to a comparator 14 and a further difference circuit 16. The outputs from both difference circuits are supplied to a divider 18, the output of which is taken to a difference circuit 20 having a permanent "1" on its positive input. The output from circuit 20 and comparator 14 are supplied to edge switch 22, which supplies digital low pass filter 24. The output of filter 24 is a modified keying signal which is then used to key a video signal in the usual manner.

The operation of the apparatus will be described with reference to the 0,0,10,90,100,100 keying signal and clip level 30 described above. Difference circuit 12 provides the difference C(i) above "80". Difference circuit 16 provides the difference C(ii) above "60". Circuits 18 and 20 provide the division and subtraction C(iii) above "¼". Comparator 14 compares the level of each two successive key words and the clip level and triggers switch 22 to transmit the output from difference circuit 20 only if the clip level is exceeded between two successive key words (10,90). Otherwise, switch 22 acts as a latch and transmits an 8-bit "0" if successive key words are below the clip level and an 8-bit "1" if they are both above the clip level.

The digital filter 24 receives the output from switch 22. Its filter characteristics are determined according to the softness required in the keying signal. This transforms the signal from switch 22 such that, for example, the 50% transition between 0 and 1 (i.e. ½) occurs at ¼ of the way between the two original key words on either side of the clip level (i.e. words 10 and 90). In this particular example, this ensures that the 50% transition in keying level occurs at a time corresponding to key signal level 30%- that is to say between the edges of the two adjacent pixels (at 10 and 90). The effect of this interpolation is to give a sub-pixel keying effect without actually sampling the key signal at a faster rate.

It will be appreciated that a liner interpolation is not essential. More complex digital "fitting" of the signal to the equivalent analog waveform of FIG. 1(a) could be achieved. For example this could be obtained by taking more than one sample of the keying signal on both sides of the clip level and constructing a non-linear waveform from these samples. Such interpolation techniques are known per se.

Because of the two dimensional nature of a digitally-sampled TV signal, the technique of the invention applies equally well to both horizontal and vertical directions.

We claim:

1. An apparatus for keying a digital video signal, which comprises means for receiving a digital keying signal stream, each signal in the stream representing information relating to an adjacent pixel to be displayed, means for comparing the levels of successive digital signals in said stream with a desired digital clip level, means for interpolating which, in the event that said clip level occurs between two successive digital signal levels, interpolates the position of the clip level between said successive digital signal levels fractionally on a sub-pixel basis, and means for transmitting said fractional level digitally in an output keying signal.

2. An apparatus according to claim 1 wherein said means for comparing includes means for providing, in said output keying signal, a digital signal representing a first logic level when the levels of two successive digital signals in said stream do not exceed said clip level, a digital signal representing a second logic level when the levels of two successive digital signals in said stream exceed said clip level, and said means for interpolating provides said interpolated signal at a level fractionally between said first and second logic levels as an interpolated representation of said clip level.

3. An apparatus according to claim 1 wherein said means for comparing comprises means for comparing the levels of two successive digital signals on both sides of a given clip level and said means for interpolating interpolates the position of the clip level linearly therebetween.

4. An apparatus according to claim 2 wherein said means for comparing comprises means for comparing the levels of two successive digital signals on both sides of a given clip level and said means for interpolating interpolates the position of the clip level linearly therebetween.

5. An apparatus according to claim 3 wherein said interpolating means comprises means for deriving the difference between the levels of two successive digital signals in said stream, means for deriving the difference between the level of one of said digital signals and said clip level, and means for dividing said first and second derived differences.

6. An apparatus according to claim 5 wherein said comparing means comprises means for transmitting the output of said dividing means in said output keying signal only when said clip level is exceeded between two successive digital signals in said stream.

7. An apparatus according to claim 1 which additionally comprises a digital low-pass filter for receiving said output keying signal.

8. An apparatus according to claim 1 arranged to key said digital video signal in the horizontal direction.

9. An apparatus according to claim 1 arranged to key said video digital signal in the vertical direction.

10. A method of keying a digital video signal, which comprises receiving a digital keying signal stream, wherein each signal in the stream represents information relating to an adjacent pixel to be displayed, comparing the levels of successive digital signals in said stream with a desired clip level, interpolating, in the event that said clip level occurs between two successive digital signal levels, the position of the clip level between said successive digital signal levels fractionally on a sub-pixel basis, and transmitting said fractional level digitally in an output keying signal.

11. A method according to claim 10 which comprises transmitting, in said output keying signal, a digital signal representing a first logic level when two successive digital signals in said stream do not exceed said clip level, a digital signal representing a second logic level when two successive digital signals exceed said clip level, and said interpolated signal at a level fractionally between said first and second logic levels as an interpolated representation of said clip level.

12. A method according to claim 10 wherein said interpolation is linear.

13. A method according to claim 10 wherein said digital video signal is a digital colour TV signal.

14. A method according to claim 11 wherein said interpolation is linear.

15. A method according to claim 11 wherein said digital video signal is a digital colour TV signal.

16. A method according to claim 12 wherein said digital video signal is a digital colour TV signal.

* * * * *